(12) United States Patent
Gartner et al.

(10) Patent No.: US 6,987,151 B2
(45) Date of Patent: Jan. 17, 2006

(54) CONTINUOUS POLYMERIZATION PROCESS FOR THE MANUFACTURE OF SUPERABSORBENT POLYMERS

(75) Inventors: Herbert A. Gartner, Baden-Baden (DE); Katrin Nuyken, Buhl (DE); Deno F. O'Connor, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 27 days.

(21) Appl. No.: 10/486,777

(22) PCT Filed: Aug. 26, 2002

(86) PCT No.: PCT/US02/27361

§ 371 (c)(1),
(2), (4) Date: Sep. 27, 2004

(87) PCT Pub. No.: WO03/022896

PCT Pub. Date: Mar. 20, 2003

(65) Prior Publication Data

US 2005/0051925 A1    Mar. 10, 2005

Related U.S. Application Data

(60) Provisional application No. 60/318,816, filed on Sep. 12, 2001.

(51) Int. Cl.
*C08F 2/10*    (2006.01)
(52) U.S. Cl. .................... 526/65; 526/317.1; 526/348
(58) Field of Classification Search ................. 526/65, 526/317.1, 348
See application file for complete search history.

(56) References Cited

U.S. PATENT DOCUMENTS

| | | | |
|---|---|---|---|
| 3,640,509 A | 2/1972 | Inamura et al. | 259/104 |
| 3,964,874 A | 6/1976 | Maruko et al. | 23/285 |
| 4,004,785 A | 1/1977 | Kajimoto et al. | 259/104 |
| 4,625,001 A * | 11/1986 | Tsubakimoto et al. | 526/88 |
| 4,666,983 A | 5/1987 | Tsubakimoto et al. | 525/119 |
| 4,734,478 A | 3/1988 | Tsubakimoto et al. | 527/300 |
| 4,769,427 A | 9/1988 | Nowakowsky et al. | 526/64 |
| 4,833,222 A | 5/1989 | Siddall et al. | 526/200 |
| 4,857,610 A | 8/1989 | Chmelir et al. | 526/88 |
| 5,342,899 A | 8/1994 | Graham et al. | 525/301 |
| 5,439,993 A | 8/1995 | Ito et al. | 526/93 |
| 5,629,377 A | 5/1997 | Burgert et al. | 524/832 |
| 6,710,141 B1 | 3/2004 | Heide et al. | 526/88 |

FOREIGN PATENT DOCUMENTS

| | | |
|---|---|---|
| EP | 0454 497 | 10/1991 |
| EP | 0303440 | 7/1992 |
| EP | 0695 762 | 2/1996 |
| EP | 0812 873 | 12/1997 |
| EP | 0802 823 | 9/1998 |
| EP | 0775 161 | 10/1998 |
| WO | WO 93/05080 | 3/1993 |

OTHER PUBLICATIONS

Derwent Abstract 1990-194927, European Patent 374,709, G. Haslauer et al., Jun. 27, 1990.
Derwent Abstract 1997-282283, International Patent 97/18890, J. Houben, May 29, 1997.

(Continued)

*Primary Examiner*—William K. Cheung

(57) ABSTRACT

A continuous process for producing water-insoluble, water-swellable polymers comprises subjecting a monomer and initiator to polymerization conditions in a reactor system having at least 3 zones.

22 Claims, 1 Drawing Sheet

OTHER PUBLICATIONS

Figure 1:
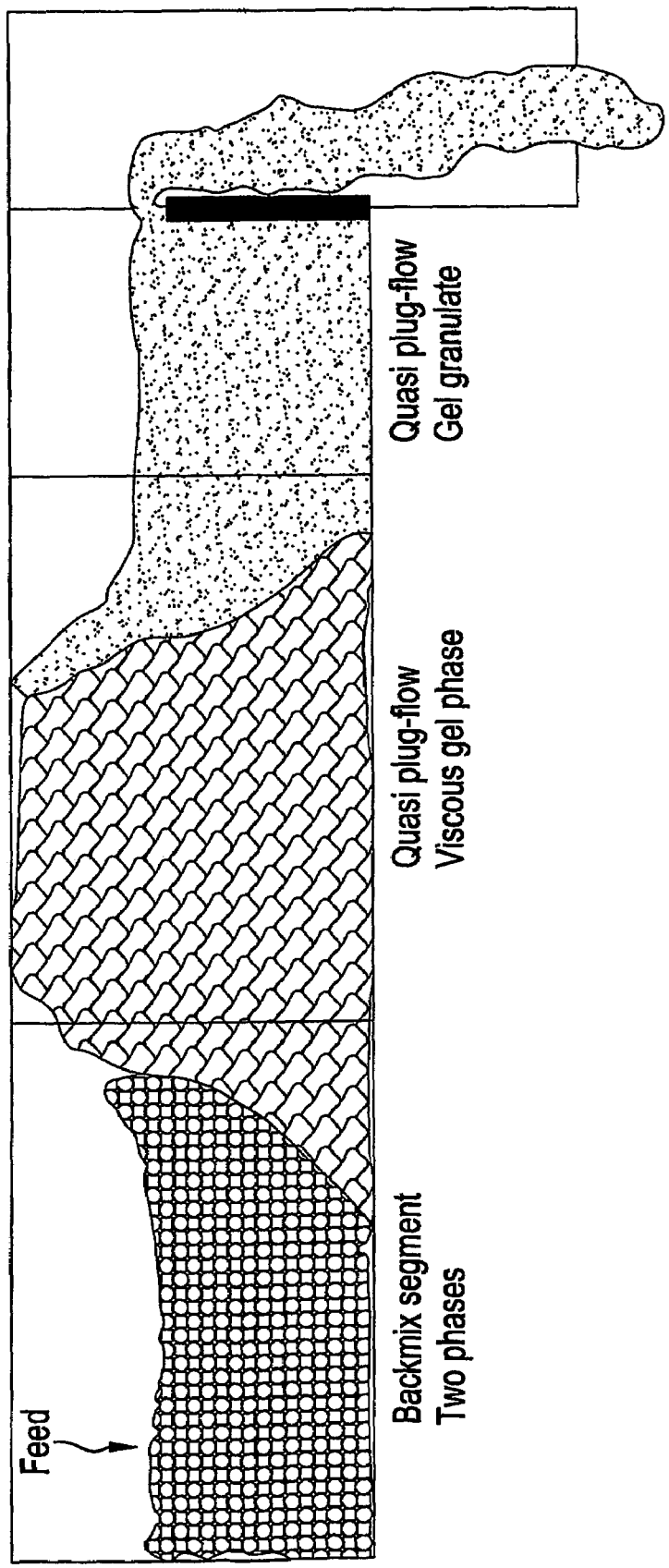

Buchholz, F. L. and Graham, A.T., "Modern Superabsorbent Polymer Technology," John Wiley & Sons: 1998, 153.
Derwent Abstract 1982-59935E, Japanese Patent 57-34101, Feb. 24, 1982.
Derwent Abstract 1981-35441D, Japanese Patent 56-32514, Apr. 2, 1981.
Derwent Abstract 1997-352712, European Patent 783,005, H Brod et al., Jul. 9, 1997.

* cited by examiner

CONTINUOUS POLYMERIZATION PROCESS FOR THE MANUFACTURE OF SUPERABSORBENT POLYMERS

This applications claims the benefit of Provisional Application No. 60/318,816, filed Sep. 12, 2001.

This invention relates to a process for preparing superabsorbent polymers.

Superabsorbent polymers are well-known materials that commonly are used in personal care articles such as diapers. These polymers are known to absorb several times their weight of, for example, water, saline solution, urine, blood, and serous bodily fluids.

Several processes for preparing superabsorbent polymers are known, including agitated and unagitated batch and continuous processes. For example, U.S. Pat. No. 4,857,610 discloses an unagitated batch or continuous process for polymerizing water-soluble polymers on a conveyor belt. JP Patent Application 57-34101 discloses a batch polymerization process that uses a reactor having multiple rotating arms. EP 0 303 440 B1 teaches batch polymerization in a reaction vessel having a plurality of rotary shafts each fitted with stirring blades, although it is stated that the process can also be conducted continuously. A static mixer is used to mix reactants as they enter a plug flow reactor in JP Patent Application 56-32514. U.S. Pat. No. 4,769,427 teaches a continuous polymerization processes in a vessel having a single rotating shaft. A continuous polymerization processes in a vessel having multiple rotating shafts is taught in U.S. Pat. No. 4,625,001. These processes all have various inadequacies and deficiencies. Accordingly, it would be desirable to have an improved continuous process for preparing a superabsorbent polymer.

The present invention includes an improved process for the preparation of water-absorbent, water-insoluble polymers, the process comprising:

continuously polymerizing a monomer in a reactor system comprising at least 3 zones;

wherein the first zone is an initiation zone to which there is fed a monomer, an initiator and water under conditions such that the polymerization of the monomer is initiated;

wherein the second zone is a gel-phase zone;

wherein the third zone is a granulation zone;

wherein the reactor system has at least two rotating shafts in each of the second and third zones;

wherein the peak temperature in the second and third zones is from 50° C. to 100° C.; and wherein at least a portion of the water fed to the first zone optionally is in the form of steam.

FIG. 1 is a schematic showing the three zones in a preferred embodiment of the reaction vessel employed in the process of the invention.

In the process of the present invention, superabsorbent polymer is prepared continuously in a reaction system comprising at least three zones. The first zone is an initiation zone. The second zone is a viscous gel zone, and the third zone is a granulated gel zone. Optionally, a fourth zone for finishing the polymerization and holding the polymer before further treatment, such as drying, may be used. The preferred process of the invention involves polymerizing a suitable monomer in the presence of a covalent crosslinking agent and an initiator.

The water-swellable or lightly crosslinked hydrophilic polymers suitably prepared by the process of the present invention can be any of the known hydrophilic polymers which are capable of absorbing large quantities of fluids. In particular, preferred water-absorbent polymers are water-absorbent polymers that contain carboxyl moieties. Preferably, at least about 0.01 equivalent of carboxyl groups are present per 100 grams of the water-absorbent polymer. Among preferred carboxyl-containing water absorbent polymers are partially neutralized products of starch-acrylic acid or polyvinyl alcohol graft copolymers, crosslinked products of hydrolyzates of acrylamide copolymers, partially neutralized products of polyacrylic acids and crosslinked products of partially neutralized polyacrylic acids.

Suitable $\alpha,\beta$-ethylenically unsaturated monomers include, for example, acrylic acid, methacrylic acid, crotonic acid, isocrotonic acid and alkali metal salts and ammonium salts thereof; itaconic acid, acrylamide, methacrylamide and 2-acrylamido-2-methyl-1-propane sulfonic acid and its salts. The preferred monomers include acrylic acid and methacrylic acid and their respective salt forms such as alkali metal or ammonium salts. Preferably, the monomers are water soluble. The water-soluble monomers can be employed in aqueous solution in amounts ranging from 10 percent to 80 percent by weight based on the total weight of the aqueous monomer solution. Preferably, the amount of monomer ranges from 15 percent to 60 percent based on the total weight of the aqueous monomer solution. Optionally, minor amounts of other water-soluble, unsaturated monomers, such as alkyl esters of the acid monomers, including, for example, methyl acrylate or methyl methacrylate, may be present in the water absorbent polymer. In addition, certain grafting polymers such as, for example, polyvinyl alcohol, starch and water soluble or swellable cellulose ethers may be employed to prepare products. Such grafting polymers, when employed, are used in amounts up to about 10 weight percent based on the $\alpha,\beta$-ethylenically unsaturated monomer. Mixtures of monomers can be employed.

The polymerization may be carried out using acid monomers that are not neutralized or that have been fully or partially neutralized prior to the polymerization. Neutralization is conveniently achieved by contacting the aqueous monomer solution with an amount of base sufficient to neutralize between 20 and 95 percent of the acid groups present in the acid monomers. Preferably, the amount of base will be sufficient to neutralize between 40 percent and 85 percent, and most preferably between 55 percent and 75 percent of the acid groups present in the acid monomers.

Suitable compounds that are useful to neutralize the acid groups of the monomer include those bases that will sufficiently neutralize the acid groups without having a detrimental effect on the polymerization process. Examples of such compounds include alkali metal hydroxides, and alkali metal carbonates and bicarbonates. Mixtures of bases can be employed. Preferably, sodium or potassium hydroxides or carbonates are employed to neutralize the monomer. In determining the desired degree of neutralization, care must be taken to ensure that the pH of the resulting crosslinked absorbent polymer, which will be contacted with or dispersed in an aqueous fluid to be absorbed, is maintained in a range appropriate for the applications for which the polymer is intended. Alternatively, the polymerization can be carried out employing unneutralized monomers and thereafter neutralizing, as is known in the art.

A conventional vinyl addition polymerization initiator advantageously is used in the polymerization of the water-soluble monomers and the crosslinking agent. A free radical polymerization initiator that is sufficiently soluble in the monomer solution to initiate polymerization is preferred. For example, water soluble persulfates such as potassium persulfate, ammonium persulfate, sodium persulfate, and other alkali-metal persulfates, hydrogen peroxide and water soluble azo-compounds such as 2,2'-azobis-(2-amidinopropane) hydrochloride may be used. Some of these initiators, such as hydrogen peroxide, can be combined with reducing substances such as sulfites, amines or ascorbic acid to form known redox type initiators. The total amount of initiator used may range from 0.01 to 1.0 weight percent, preferably 0.01 to 0.5 weight percent, based on the total weight of $\alpha,\beta$-ethylenically unsaturated monomer.

The water-absorbent polymer preferably is lightly covalently crosslinked to render it water-insoluble and water-swellable. The desired crosslinked structure can be obtained by the copolymerization of the selected water-soluble monomer and a crosslinking agent possessing at least two polymerizable double bonds in the molecular unit. The crosslinking agent is employed in an amount effective to covalently crosslink the water-soluble polymer. The preferred amount of crosslinking agent is determined by the desired degree of absorption capacity and the desired strength to retain the absorbed fluid, that is, the desired absorption under load (AUL). The crosslinking agent advantageously is used in amounts ranging from 0.0005 to 5 parts by weight per 100 parts by weight of $\alpha,\beta$-ethylenically unsaturated monomer used. More preferably, the amount ranges from 0.1 to 1 part by weight per 100 parts by weight of the $\alpha,\beta$-ethylenically unsaturated monomer. Usually, if an amount over about 5 parts by weight of crosslinking agent per 100 parts monomer is used, the resulting polymer will have a crosslinking density that is too high and will exhibit reduced absorption capacity and increased AUL. If the crosslinking agent is used in an amount less than 0.0005 part by weight per 100 parts monomer, the polymer usually has a crosslinking density that is too low, and when contacted with the fluid to be absorbed becomes sticky and exhibits a lower initial absorption rate.

While the covalent crosslinking agent preferably is soluble in the aqueous solution of the $\alpha,\beta$-ethylenically unsaturated monomer, the crosslinking agent may be merely dispersible in such a solution. The use of suitable dispersing agents is disclosed in U.S. Pat. No. 4,833,222, the teachings of which are incorporated herein by reference. Examples of suitable dispersing agents include carboxymethyl cellulose suspending aids, methyl cellulose, hydroxypropyl cellulose, and polyvinyl alcohol. Such dispersing agents are advantageously provided at a concentration between 0.005 and 0.1 weight percent, based on the total weight of $\alpha,\beta$-ethylenically unsaturated monomer.

Suitable covalent crosslinking agents include compounds having in one molecule 2 to 4 groups selected from the group consisting of $CH_2=CHCO-$, $CH_2=C(CH_3)CO-$ and $CH_2=CH-CH_2-$. Exemplary covalent crosslinking agents include: diallylamine; triallylamine; diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; tetra-acrylate and tetramethacrylate of pentaerythritol; allyl methacrylate; and tetraallyloxyethane; and the highly ethoxylated derivatives of trimethylolpropane, pentaerythritol, tetra-acrylate and tetramethacrylate of pentaerythritol, and allyl methacrylate, such as highly ethoxylated trimethylol propane triacrylate. Mixtures of covalent crosslinking agents can be employed.

In a preferred embodiment for making polymers useful in the practice of the invention, an aqueous solution of the $\alpha,\beta$-ethylenically unsaturated monomer in the partially neutralized form, the covalent crosslinking agent, the initiator and a grafting polymer substrate, if desired, is prepared. The polymerization of the mixture can be initiated by elevating the temperature of the mixture containing the initiator or by using a redox-type initiator as described above. The initiation temperature in continuous operation will be the temperature in the first zone, as described hereinbelow. The temperature at which the polymerization is carried out is highly dependent on the type of monomers used and the specific initiator system employed, as is understood by those skilled in the art. Preferably, the maximum temperature of polymerization is from 50° C. to 100° C., and most preferably is from 60° C. to 85° C.

In a preferred embodiment of the invention, a feed mixture comprising at least one monomer, water, and at least one initiator are continuously fed to the first zone of the reaction system. If desired, the temperature of the feed mixture can be higher than ambient temperature. Preferably, the temperature of the feed mixture is from 10 to 40° C., more preferably from 20 to 35° C. The feed mixture preferably is in the liquid phase.

The first zone of the reaction system is the initiation zone. This zone may contain one relatively viscous liquid phase or, preferably, a relatively low viscosity two-phase mixture of the liquid feed stream and partially polymerized polymer solids. This two-phase mixture is advantageous as it allows a higher degree of mixing than the viscous phase and facilitates improved effectiveness of any temperature control measures applied to this zone. In the two-phase situation, the fresh monomer is readily mixed with the partially polymerized material in the first zone. A high degree of mixing is achieved in the first zone; thus, good heat exchange inside the reaction mass is observed in this zone. Advantageously, the feed to the first zone has a monomer concentration of at least 35 percent by weight based on the weight of the feed to the first zone, preferably at least 40 percent, and more preferably at least 45 percent. The temperature in the first zone is preferably from 30 to 100° C. More preferably, the temperature of the first zone is from 40 to 85° C. In one embodiment of the invention, steam is fed to the first zone both as a source of water and as a source of heat. Preferably, from 0.5 to 5 weight percent of the water fed to the first zone is in the form of steam. The conversion in this zone can be up to about 40 percent. Preferably, the conversion in the first zone is from 10 to 40 percent. The residence time in the first zone is from 20 to 50 percent of the total residence time in all reaction zones.

In contrast to the relatively free-flowing material in the first zone, the material in the second zone is a highly viscous gel. In view of the high viscosity in the second zone, material passing through this zone does so in a largely plug flow manner. The conversion of monomer to polymer at the end of the second zone preferably is from 50 to 75 percent. Generally speaking, the temperature of the gel material in the second zone gradually increases as it moves through the zone. The temperature in the second zone preferably is from 50 to 85° C. The residence time of polymer in this zone is from 20 to 50 percent of the total residence time in all reaction zones.

The function of the third zone is to convert the gel mass into a free-flowing granulated material. From the second to the third zone, the polymer in the reaction system changes from a highly viscous gel to a relatively free-flowing granulated gel. At this stage of the process, the polymerization reaction is almost complete, and the degree of conversion preferably is at least 90 percent by the time the polymer exits the reactor, and can be up to 99.9 percent or higher. The temperature in this zone is relatively stable. The residence time of polymer in this zone is from 10 to 60 percent of the total residence time of the material in all reaction zones. It will be understood by those skilled in the art that the total residence time can not exceed 100% of the residence time.

Preferably, at least zones two and three are operated under vacuum. The operating pressure preferably is from 100 to 800 mbar, more preferably 200 to 600 mbar. However, it is also preferred that the operating pressure is such that the liquid in the first zone does not boil. Among the advantages associated with operating under vacuum, versus positive pressure, are lower operating temperature, leading to lower extractables and improved absorption characteristics. It is also preferred that any water contained in the vacuum line be condensed and returned to the third zone. The condensate returned to the third zone enhances the flowability of the polymer gel in the third zone. Various additives, as described herein, can be added to the reaction system in the second or third zone, or both, as desired.

One of the major advantages of the process of the present invention is that it allows the formation of the three reaction zones and the distinct, separate temperature control of each of the three zones according to the most appropriate temperature for the reaction in each of the zones. Among other temperature control measures, such as the temperature of the feed stream and the monomer concentration of the feed, the most appropriate measures are jacket and shaft heating or cooling, steam injection into the reacting mass and evaporative cooling under reduced pressure. Depending on the size of the reactor, temperature control via jacket and shaft of the relevant segment might be sufficient especially for laboratory and pilot size reactors. For commercial scale reactors, however, the heat exchanger surface could be too small for sufficient heat exchange. In this case, steam injection and evaporative cooling in combination with jacket heating and/or cooling will provide a adequate control of the temperatures in the various zones.

In one embodiment of the invention, the three zones of the reaction system are all contained in one reactor vessel. For example, the polymerization can be conducted in an ORP model reactor available from List AG. In another embodiment of the invention, the first zone is contained in one vessel and the second and third zones are contained in a separate vessel. Each embodiment has advantages relative to the other. A preferred reactor vessel for at least the second and third zones is a vessel containing two screws or kneading arms that function, at least in part, to convey the vessel contents along the axis of the vessel. In a preferred embodiment, one of the arms acts as a kneading arm and the other acts as a cleaning arm. It is preferred that the rotation speed of the two arms is different, although the speed can be the same for both arms. Preferably, these arms rotate in opposite directions, and the radii of the arms is overlapping. In a preferred embodiment, the two arms are at least substantially parallel to each other. However, it is also possible to employ a vessel having more than two arms, a vessel with arms that rotate in the same direction, a vessel in which the radii of the arms does not overlap, a vessel in which the arms are not at least substantially parallel, or any combination of these. Optionally, the internal surfaces of the vessel can be coated, for example with polytetrafluoroethylene, for the purpose of reducing the degree of adhesion of the reactor contents to the walls of the vessel. In a preferred embodiment, the shafts of the vessel are cooled in order to provide additional heat exchange capabilities.

The resultant polymer is typically pre-sized and dried using means well-known in the art. Suitable drying means include fluidized bed driers, rotary driers, forced air ovens and through-circulation band dryers. In some instances, drying will occur in two or more stages, that is, multi-stage drying. Following the completion of drying, the polymer is further sized to form particles preferably having an average diameter less than 2 mm and more preferably less than 1 mm. Preferably, the final polymer product has an average particle size of at least 160 microns, and more preferably at least 200 microns.

If desired, the dried particles may be heat treated in accordance with the procedures set forth in WO 93/05080 and/or U.S. Pat. No. 5,629,377, the teachings of which are incorporated herein by reference. Such heat treatment is preferably carried out at a temperature of at least 170° C., more preferably of at least 180° C., and most preferably of at least 190° C. Such heat treatment is preferably carried out at a temperature of less than 250° C., more preferably less than 240° C. The method of heat treatment is not critical. For example, forced air ovens, fluidized bed heaters, and heated screw conveyors may be successfully employed. If desired, the heated polymer may be remoisturized for ease in handling.

A way to improve absorptive properties of the polymer particles may be to surface crosslink the polymer particles. Procedures for surface crosslinking are well known in the art and described in, for example, U.S. Pat. No. 4,734,478 and U.S. Pat. No. 4,666,983. These procedures may increase the modulus and/or the absorbency under load of the polymer particles.

The polymer produced by the invention can optionally include known additives such as, for example, anticaking agents, and low dust additives; In one embodiment of the invention, polymer fines are recycled by introducing them to the first zone. Recycling of polymer fines is known in the art. For example, see U.S. Pat. No. 5,342,899.

Superabsorbent polymers are useful in the manufacture of moisture absorbent articles, such as disposable diapers, including thin and ultra thin disposable diapers, sanitary napkins, incontinence garments and bandages.

Absorbent articles can comprise from 5 percent to 95 percent by weight of superabsorbent polymers. In a typical absorbent article, the superabsorbent polymer can be dispersed in a fiber matrix; in such an article the superabsorbent advantageously is present in an amount from 30 to 70 weight percent based on the weight of the article and the fiber matrix is present in an amount of from 70 to 30 weight percent based on the weight of the article. In another form of absorbent article, the superabsorbent may be present in a containment structure in which the superabsorbent polymer is present in an amount of 30 to 95 percent by weight. Combinations of dispersed superabsorbent polymer and contained superabsorbent polymer are also known.

The following examples and comparative experiments are given to illustrate the invention and should not be construed as limiting its scope. All parts and percentages are by weight unless otherwise indicated.

The absorption capacity (AC) is measured according to the method stated in Buchholz, F. L. and Graham, A. T., "Modem Superabsorbent Polymer Technology," John Wiley & Sons (1998), page 153.

Recipes

Three different recipes were used. The abbreviation "b.o. AA" stands for "based on acrylic acid," and this refers to the weight of the acrylic acid before it is neutralized The term "solids" as used for the recipes refers to the components of the recipe that are not water. Thus, Recipe 1A, which is 45 percent solids, is 55 percent water. PEG stands for polyethylene glycol. HE-TMPTA stands for highly ethoxylated trimethylolpropane triacrylate. VERSENEX 80 is an aqueous solution of the pentasodium salt of diethylenetriaminepentaacetic acid, and is available from The Dow Chemical Company. The abbreviation "n.m." stands for "not measured."

Recipe 1A (45 percent solids)

| Component | Parts | |
|---|---|---|
| Acrylic acid (99 percent min.) | 376.35 | 37.63 percent b.o. total |
| Sodium hydroxide | 142.18 | |
| Water | 476.26 | |
| PEG | 2.26 | 6000 ppm b.o. AA |
| HE-TMPTA | 1.28 | 3400 ppm b.o. AA |
| Versenex 80 | 0.70 | 750 ppm b.o. AA |
| Potassium Chlorate (5 percent aqueous soln.) | 1.99 | 265 ppm b.o. AA |

Recipe 1B (36 percent solids)

| Component | Parts | |
|---|---|---|
| Acrylic acid (99 percent min.) | 301.08 | 30.11 percent b.o. total |
| Sodium hydroxide | 113.74 | |
| Water | 580.19 | |
| PEG | 1.81 | 6000 ppm b.o. AA |
| HE-TMPTA | 1.02 | 3400 ppm b.o. AA |
| Versenex 80 | 0.56 | 750 ppm b.o. AA |
| Potassium Chlorate (5 percent aqueous soln.) | 1.60 | 265 ppm b.o. AA |

Recipe 2A (45 percent solids)

| Component | Parts | |
|---|---|---|
| Acrylic acid (99 percent min.) | 376.35 | 37.63 percent b.o. total |
| Sodium hydroxide | 142.18 | |
| Water | 476.26 | |
| PEG | 1.69 | 4500 ppm b.o. AA |
| HE-TMPTA | 0.83 | 2200 ppm b.o. AA |
| Versenex 80 | 0.70 | 750 ppm b.o. AA |
| Potassium Chlorate (5 percent aqueous soln.) | 1.99 | 265 ppm b.o. AA |

Set-Up of the Reactor

For all trials a List ORP 25 (30.6 liters total volume) reactor was employed. The reactor is a generally cylindrical vessel having three segments, each of which has its own jacket. The temperature in the agitator system and each of the three jackets can be individually controlled. The discharge segment possesses at its end vertical channels through which the polymer product can fall down to an attached product container. If desired, a discharge double screw can be inserted into the vertical channels to provide forced product discharge.

For polymerization experiments conducted at atmospheric pressure, a two-way-valve was installed at the reactor outlet. One outlet of the valve was connected to the product container, which collected the continuously discharged product, and the other valve outlet was connected to a plastic hose, which was nitrogen purged and heat-sealed at its far end. This plastic hose allowed samples to be taken during operation under oxygen exclusion. The reactor was equipped with a 13.5 kW drive. For polymerization experiments conducted under vacuum, a straight outlet line was installed for vacuum-tight sealing of the product container. This line was piped and valved in such a way that the product containers could be exchanged while maintaining the desired vacuum in the reactor. The equipment also included a system allowing the containers to be de-oxygenated and evacuated prior to opening them to the reactor.

Each of the segments was equipped with a thermocouple to measure the temperature (T1 for the first, T2 for the middle and T3 for the discharge segment) of the solid or solid/liquid material in each segment. Thermocouples were also in place to measure the temperatures of the heat exchange fluid (water) of the inlet and outlet of each segment. A flange at the feed-end and a vent system connected to the discharge end of the reactor allowed reactor purging with nitrogen. A condenser in the vent line, fixed on top of the reactor, condensed water vapor in the vent line, and the condensate was refluxed to the third zone of the reactor.

Peristaltic pumps fed the monomer mix and the initiators continuously to the feed-end of the reactor. The main initiator (sodium persulfate) was injected directly into the monomer feed line and mixed with it in an inline mixer. The co-initiator was injected to the monomer feed right at the point where the monomer mix entered the reactor via a boring through the front flange. A second boring through the front-flange carried a valve for direct steam injection to the reaction mass of the initiation zone.

The monomer mix, prepared in accordance with the above recipes, was loaded into a 150-liter plastic drum that could be closed with a lid. The lid had appropriate openings for an inert-gas dip pipe, a vent line, a dip-pipe for taking out the de-oxygenated monomer mix and a feed for newly prepared mix. This installation was operated as a bubble column with a nitrogen stream for sufficient de-oxygenation.

The Method of Dry SAP Heat Treatment

Gel samples were dried at 170° C. either for 20 minutes in a belt dryer or in a forced-air oven for 2 hours. Dry water-absorbent polymer particles were heat-treated as follows. A zone was pre-heated with a hot-air gun. Once the target temperature was reached and stabilized, the polymer sample was placed in the zone and a thermometer was placed in contact with the sample. The temperature of the sample was monitored until it stabilized at the target temperature and the sample was maintained at the target temperature for the desired time.

Centrifuged Absorption Capacity (CC)

A 200 mg sample of water-absorbent polymer particles was placed in a sealable tea bag (63.5 by 76.2 mm), immersed for 30 minutes in a 0.9 percent saline solution (sodium chloride) and then centifuged for three minutes at 1400 rpm. The weight ratio of the saline solution absorbed minus the blank (saline solution absorbed by the tissue of the tea bag) to the initial weight of the dry water-absorbent polymer particles was determined and reported as centrifuged absorption capacity (CC).

Absorption Under Load (AUL)

A nylon screen (50 by 50 mm; 100 mesh) was put on top of a perforated metal plate followed by a filter paper and finally by a stainless steel cylinder of 26 mm inner diameter, 37 mm outer diameter and a height of 50 mm, whose ends were both open. A 167 mg portion of water-absorbent polymer particles was placed in the cylinder and evenly distributed. A nonwoven sheet of a diameter of 26 mm covered the polymer and was pressed down with a plastic piston of a diameter of 20 mm, which carried a weight. The total mass of the piston and the weight on top the piston was 109.4 gram to give a 0.3-psi load. Proportionally heavier weights were placed onto the piston to apply loads of 0.6 and 0.9 psi. The metal plate with the product in the cylinder on top was immersed into a 0.9 percent saline solution such that the nylon screen and the solution surface had the same level so that the filter paper and the water-absorbent polymer particles were able to absorb the liquid without any hydrostatic pressure. The particles were soaked for one hour. The plate was removed from the water reservoir and the excess liquid in the holes of the metal plate and in the nylon screen was soaked up by paper tissue. Then the weight was removed from the swollen gel and the gel was weighed. The weight ratio of saline solution absorbed under load to water-absorbent polymer particles was reported as the absorption under load (AUL).

Extractables

A 1 gram portion of water absorbent polymer particles and 185 grams of 0.9 percent saline solution were placed in a 250 ml jar which was capped and put onto a shaker for 16 hours. A part of the extraction solution was filtered. With the aid of a Metrohm Titroprocesser, the pH of a defined volume of the filtrate was adjusted to pH 10 by 0.1 N NaOH and finally titrated to pH 2.7 by hydrochloric acid to determine the amount of extractables in the filtrate. From this, the amount of extractables in the water-absorbent polymer was calculated.

Residual Monomer

A 1 gram portion of water absorbent polymer particles and 185 grams of 0.9 percent saline solution were placed in a 250 ml jar which was capped and put onto a shaker for 16 hours. A part of the extraction solution was filtered and a sample of the filtrate was injected into a liquid chromatograph utilizing an ODS column and UV detection at about 205 nm. The residual monomer was calculated by comparing the peak area of the acrylic acid peak to that of a standard sample.

EXAMPLE 1

A monomer mix was prepared according to recipe 1A, introduced into the plastic drum described above and deoxygenated for at least 30 minutes by purging it with nitrogen. A 10 percent aqueous sodium persulfate solution and a 1 percent aqueous ascorbic acid solution were prepared in separate 2-liter containers, which were deoxygenated and fixed to the feed lines. The temperature of all jacket segments and of the agitator system was set to 60° C., a nitrogen stream of 500 liter/hour was blown through the reactor to maintain the inert-gas atmosphere, and the speed of the kneading shaft was set to 12 rpm. After the temperature of the heat exchange fluid for all segments of the reactor reached the set point temperature, the monomer mix feed was started and set to a feed rate of 90 kg/h (2.9 kg per hour per liter of total reactor volume). The monomer mix had a temperature of 22° C. The initiators were fed simultaneously with the monomer feed. Sodium persulfate was fed at a rate of 45.25 g/hour (1350 ppm b. o. AA) and ascorbic acid was fed at a rate of 4.68 g/hour (145 ppm b. o. AA). After about 30 minutes the polymerization reached steady-state. This was indicated a relatively constant temperature profile along the reactor, as follows: T1 (initiation zone)=54±3° C., T2 (gel phase)=81±3° C., T3=82° C. and the product temperature as it entered the recovery container was approximately 100° C. The product container was not insulated, so that the product could cool down relatively quickly.

This polymerization run was conducted for 10 hours without interruption. Gel samples were taken during continuous operation by charging about one kg of gel into the plastic hose fixed to the second outlet of the two-way valve. The gel sample was then moved to the far end of the hose, the hose was heat-sealed between the sample and the reactor, and the sample-containing portion was cut from the hose. The gel samples obtained such under inert gas atmosphere were placed in an oven for 60 minutes at 70° C. to complete the monomer conversion. The gel was then sized so that it was from 1 to 5 mm in diameter, and then dried in a forced air oven at 170° C. for two hours. The dry polymer was ground in a household appliance (Moulinette) and sieved. For all analytical methods a 30 to 50 mesh fraction was employed.

The data of the evaluation of these samples are reported in Table 1. The average values of the nine samples are also given. "RAA" stands for residual acrylic acid.

TABLE 1

Properties of the non heat-treated SAP (recipe 1A) in the course of the 10 h-run

| Sample # | CC [g/g] | AUL [g/g] | | | Extract. [percent] | RAA [ppm] |
|---|---|---|---|---|---|---|
| | | 0.3 psi | 0.6 psi | 0.9 psi | | |
| 1/1 | 31.8 | 13.1 | — | — | 10.5 | 432 |
| 1/2 | 31.6 | 18.2 | — | — | 8.7 | 464 |
| 1/3 | 30.3 | 18.2 | — | — | 9.4 | 459 |
| 1/4 | 32.6 | 15.5 | — | — | 10.5 | 526 |
| 1/5 | 31.9 | 17.3 | — | — | 9.8 | 449 |
| 1/6 | 31.3 | 14.2 | — | — | 10.1 | 684 |
| 1/7 | 30.9 | 18.0 | — | — | 10.1 | 454 |
| 1/8 | 34.3 | 14.7 | — | — | 13.1 | 308 |
| 1/9 | 32.1 | 16.3 | — | — | 10.6 | 529 |
| Average | 31.87 | 16.17 | | | 10.31 | 478.33 |

Samples of the ground and sieved materials were also subjected to heat treatment. During this heat treatment the polymer particles were contacted with a hot air stream such that the temperature of the product sample was maintained at a temperature of 220° C. for 20 minutes. The data obtained from the sample evaluation is reported in Table 2.

TABLE 2

Properties of the heat-treated SAP (recipe 1A) in the course of the 10 h run

| Sample # | CC [g/g] | AUL [g/g] | | | Extract. [percent] | RAA [ppm] |
|---|---|---|---|---|---|---|
| | | 0.3 psi | 0.6 psi | 0.9 psi | | |
| 1.1/1 | 29.1 | 27.8 | 24.2 | 18.7 | 9.8 | 394 |
| 1.1/2 | 29.2 | 27.7 | 25.0 | 22.0 | 7.0 | 420 |
| 1.1/3 | 29.2 | 28.7 | 24.9 | 21.7 | 8.4 | 559 |
| 1.1/4 | 29.8 | 27.6 | 24.8 | 21.2 | 8.2 | 549 |
| 1.1/5 | 29.2 | 28.0 | 25.4 | 21.5 | 8.4 | 529 |
| 1.1/6 | 28.8 | 28.3 | 24.9 | 21.8 | 8.7 | 676 |
| 1.1/7 | 28.3 | 27.1 | 24.9 | 22.2 | 7.6 | 510 |
| 1.1/8 | 33.5 | 28.4 | 23.1 | 17.8 | 12.5 | 388 |
| 1.1/9 | 31.2 | 30.5 | 24.5 | 19.8 | 9.9 | 608 |
| Averages | 29.81 | 28.23 | 24.63 | 20.74 | 8.94 | 514.78 |

This example shows that under the given conditions, continuous polymerization can be reliably applied to produce superabsorbent polymer.

EXAMPLES 2 to 6

In this series the impact of feed rate variations was studied. The same procedure and recipe was applied as for the experiments as described in Example 1 except that the variables were changed as indicated in Table 3.

TABLE 3

Variables applied for Examples 2 to 6

| Example | Feed rate [kg/h] (*) | Persulfate [ppm b. o. AA] | Ascorbic acid [ppm b. o. AA] | Jacket temp. [° C.] | Main shaft [rpm] | Discharge temp. [° C.] |
|---|---|---|---|---|---|---|
| 2 | 30 (1.0) | 1450 | 160 | 40 | 6 | n. m. |
| 3 | 60 (2.0) | 1450 | 160 | 40 | 7 | n. m. |
| 4 | 90 (2.9) | 1450 | 160 | 50 | 7 | 100 |
| 5 | 105 (3.4) | 3400 | 400 | 50 | 11 | >100 |
| 6 | 120 (3.9) | 2300 | 205 | 60 | 11 | >100 |

(*) figures in ( ) are kg per hour per liter of total reactor volume.

The samples that were taken were processed and evaluated as described in Example 1. The results are collected in Table 4.

TABLE 4

Results from Examples 2 to 6 prior to heat treatment

| Sample # (feed rate) | CC [g/g] | AUL [g/g] 0.3 psi | AUL [g/g] 0.6 psi | AUL [g/g] 0.9 psi | Extract. [percent] | RAA [ppm] |
|---|---|---|---|---|---|---|
| 2 (30) | 27.7 | 25.4 | 11 | — | 6.3 | 180 |
| 3 (60) | 29.4 | 25.8 | — | — | 7.8 | 416 |
| 4 (90) | 28.2 | 25.5 | — | — | 7.0 | 647 |
| 5 (105) | 28.8 | 24.8 | — | — | 8.5 | 688 |
| 6 (120) | 27.4 | 23.4 | — | — | 6.8 | 1071 |

TABLE 5

Product Properties of Examples 2 to 6 after heat treatment

| Sample # | CC [g/g] | AUL [g/g] 0.3 psi | AUL [g/g] 0.6 psi | AUL [g/g] 0.9 psi | Extract. [percent] | RAA [ppm] |
|---|---|---|---|---|---|---|
| 2 (30) | 28.9 | 28.9 | 25.3 | 22.1 | 8 | 163 |
| 3 (60) | 27.9 | 28.4 | 25.4 | 22.5 | 6.6 | 495 |
| 4 (90) | 27.9 | 28.1 | 24.8 | 22.6 | 6.2 | 536 |
| 5 (105) | 27.6 | 27 | 24.3 | 22.5 | 7.5 | 599 |
| 6 (120) | 28.9 | 28.2 | 25 | 22.3 | 8.5 | 591 |

Examples 2 to 6 show that feed rates can be applied up to 120 kg/hour (up to about 4 kg/liter of total reactor volume per hour). As the feed rate increases, the residence time decreases and so, less cooling to the product occurs. This causes increased peak temperatures which may be the reason for slightly increasing extractables and increasing residual monomer values.

EXAMPLE 7

Recipe 1A was used and the reactor was equipped with a two-screw discharge conveyor. All heating units of the reactor were set to 60° C. except the jacket of the discharge segment, which was set to 20° C. The monomer mix was fed at a rate of 60 kg/hour, and the rotation speed of the kneading screw was 12 rpm. Sodium persulfate was fed at a rate of 45.25 grams/hour (1350 ppm b. o. AA) and ascorbic acid at a rate of 4.68 gram/hour (145 ppm, b. o. AA). Gel samples were taken and processed applying the same procedures as in Example 1, except that the sample was held in the oven at 70° C. for 90 minutes. The dried and sieved product had the following properties:

CC=32.1 g/g, AUL(0.3 psi)=21.2 g/g, extractables 8.6 percent, residual AA=603 ppm.

EXAMPLE 8

The procedure of Example 7 was repeated, except that recipe 1B was applied (36 percent solids) and the jacket temperature of the discharge segment of the reactor was kept at 60° C. The dried and sieved product had the following properties:

CC=36.9 g/g, AUL(0.3 psi)=12.0 g/g, extractables 9.7 percent, residual AA=458 ppm.

EXAMPLE 9

The procedure of Example 7 was repeated, except that the reactor was equipped with an adjustable weir at the discharge end instead of the two-screw discharge conveyor. In the course of the run, the weir was set to close the reactor discharge-opening to the following degrees: weir-height 0 percent, that is, the discharge opening is completely open; weir-height 33 percent, that is, the discharge opening is 33 percent closed; and weir-height 66 percent, that is, the discharge opening is 66 percent closed.

Gel samples were taken at the outlet of the reactor and were subjected to particle size distribution analysis without further processing. To determine the particle size distribution of the gel as discharged from the reactor, 100 g of gel was taken and carefully mixed with 3000 ppm, based on the total weight of the gel, of the surfactant Atlas G 1425, a polyoxyethylene sorbitol lanolin derivative available from ICI Surfactants, in order to improve the flowability of the granulated polymer gel. This treated gel was sieved through the sieving tower assembled by the sieves as listed in Table 6, using a Retsch AS 200 sieving machine. The following adjustments were selected: amplitude 1 mm, permanent sieving, and sieving time 10 minutes. The results of the analysis are gathered in Table 6 in the form of percent gel of the total retained on the specified screen.

TABLE 6

Gel fraction in percent on the screen
(* screen size is given in mm between wires of the screen)

| Gel on the screen [percent] | >0* | >3.15* | >6.3* | >10* | >16* | >25* |
|---|---|---|---|---|---|---|
| Weir-height 0 percent | 2 | 8.9 | 24.2 | 45 | 17.1 | 5.6 |
| Weir-height 33 percent | 5.1 | 15 | 26 | 39.9 | 13.9 | 0 |
| Weir-height 66 percent | 11.8 | 32 | 31.7 | 23.4 | 2.2 | 0 |

The results show that with increasing weir height the degree of filling and simultaneously the shear inside the reactor is increased. This results in a reduction of particle size of the gel that is discharged from the reactor. The average particle size in these experiments was between 7 and 12 mm.

EXAMPLE 10

Experiments were performed in order to study options to influence the temperature profile of the reacting mass in the reactor.

Recipe 1A was used. The reactor was equipped with the double-screw discharge conveyor and the main shaft of the agitator was operated at 12 rpm. Reactor heating/cooling was turned off. The monomer mix feed rate as 60 kg/hour and the initiator concentration was set to 1350 ppm (b. o. AA) of sodium persulfate and 145 ppm (b. o. AA) of ascorbic acid.

EXAMPLE 10A

The reactor was heated by direct steam injection (two kg/hour) until the following temperatures were reached: T1=71° C., T2=62° C., T3=47° C. The steam injection was then reduced to 1 kg/hour and maintained at this level for the course of the whole run (7 hours from this point on). The reactor pressure was adjusted to about 600 mbar. The feed was started slower than the target rate and was gradually accelerated until the desired feed rate was reached. After 20 to 30 minutes the reactor was at steady-state conditions and the temperatures maintained constant at the following levels: T1=60±3° C., T2=85° C., T3= 82° C. In contrast to Example 1, the product had a temperature of 87° C. after leaving the reactor. The conversion at the reactor outlet was 94.8 percent.

EXAMPLE 10B

The procedure of example 10A was repeated except that the reactor was not steam-heated. Instead, the first segment (initiation zone) was jacket heated at 60° C. The temperatures stabilized at T1=62±1° C., T2=84° C., T3=80° C. After the temperatures stabilized, $Fe_2(SO_4)_3$ was added to the persulfate solution in a concentration such that the concentration of $Fe^{3+}$ ions in the monomer mix was 3 ppm (b. o. AA). The temperatures stabilized 20–30 minutes later at: T1=65±1° C., T2=84° C., T3=80° C. The conversion at the reactor outlet was 97.6 percent.

EXAMPLE 10C

The initial procedure of Example 10A was followed and essentially the same temperatures were reached. Then, 5 ppm (b. o. AA) of iron ions were added to the initiator system. This led to a change in temperature, and the following temperatures were recorded for about one hour: T1=70±1° C., T2=85° C., T3=82° C. The steam was switched off, and the jacket of segment one heated to 77° C. Polymerization continued without interruption and the temperatures did not change, except that T3 dropped to about 79° C. The conversion at the reactor outlet was 98 percent.

The results of Examples 10A–C show that the temperature inside the reactor can be easily be adjusted and controlled as desired for the specific stages of polymerization. Steam injection and/or metal ion addition will efficiently maintain the temperature in the initiation zone at the level needed for a high initial polymerization rate. This will be important at larger scale where jacket heating may not be sufficient to provide the level of heat exchange desired. Evaporative cooling at reduced pressure combined with reflux condensation also proved to be efficient for control of peak temperature. The product temperature never exceeded 87° C.

EXAMPLE 11

Reactor Horizontal, 60 kg/h

The procedure of Example 1 was repeated except that the monomer mixture was prepared in accordance to Recipe 2A and fed at a rate of 60 kg/hour. The polymerization experiment was started and continued until stable, constant conditions were reached. Then, the monomer mix feed was switched over from the standard feed to a feed of the same formulation except that the acid had been neutralized by potassium hydroxide instead of sodium hydroxide. This potassium-containing mix was fed for 30 seconds, then the feed was changed back to the standard mix. The point in time of the feed change back to standard feed is defined as zero residence time. Samples of gel were taken under inert gas atmosphere every minute from the time—2 until 16 minutes and then on a two minute basis up to the time 30 minutes. The samples were analyzed for the relative potassium concentration by X-ray fluorescence to determine the intensity of the potassium fluorescence. The values were plotted and an average residence time of about 5 minutes was obtained from the cumulative plot.

EXAMPLE 12 (REACTOR INCLINED, 60 kg/h)

The method of Example 11 was repeated except that the reactor was raised at the discharge end by 1.83°. An average residence time of about 6.2 minutes was determined.

EXAMPLE 13 (RAECTOR HORIZONTAL, 90 kg/h)

The method of Example 11 was repeated except that the feed rate was 90 kg/hour. An average residence time of about 4 minutes was determined The results also show that 80 percent of the feed has a residence time of less than 8 to 12 minutes, depending on the conditions, and that the residual 20 percent of the feed has a longer residence time.

The following four experiments demonstrate the benefit of peak-temperature control during polymerization.

EXAMPLE 14

The procedure of Example 1 was repeated except that the pressure in the reactor was set to 600 mbar and the monomer mix was Recipe 2A fed at a feed rate of 60 kg/h (1.93 kg/liter reactor volume per hour). 1.2 kg of steam was injected to the initiation zone for reliable and fast initiation. The temperature of the reaction mass never exceeded 85° C. The gel sample taken was held at 70° C. for 1 hour and than further processed and evaluated. The properties obtained are reported in the following table.

EXPERIMENT 14A (NOT AN EMBODIMENT OF THE INVENTION)

Experiment 14 was repeated except that the reactor was maintained at atmospheric pressure and that the feed rate was increased to 90 kg/hour (2.9 kg/liter reactor volume per hour). No steam was injected. The gel sample obtained had a temperature of 100° C.

EXAMPLE 15

Example 3 (feed rate 60 kg/hour) was repeated, except that segment 3 of the jacket was cooled to 20° C. (T3) in order to maintain the product temperature at 80° C. or below until the reaction of polymerization had finished. The gel sample taken was held at 100° C. for 90 minutes and then further processed.

Experiment 15A (Not an Embodiment of the Invention)

Example 15 was repeated with a feed rate of 90 kg/hour and with jacket and shaft temperatures of 60° C. in all segments. This setting allowed the product temperature to rise to 100° C. at the discharge end.

TABLE 7

Results demonstrating the benefit of peak-temperature control

| Example | CC[g/g] | AUL 0.3 psi [g/g] | Extractables [percent] |
|---|---|---|---|
| Example 14 | 37.3 | 10.4 | 12.4 |
| Experiment 14A | 37.3 | 7.9 | 19.5 |
| Example 15 | 30.4 | 18.6 | 7.3 |
| Experiment 15A | 32.4 | 15.4 | 10.1 |

The data in the preceding table show that peak temperatures of higher than 85° C. lead to higher extractables levels. Vacuum was applied in Example 14 for temperature control. In Example 15, cooling was sufficiently achieved by jacket cooling. Comparison of the results of Examples 14, 15 and Comparative Experiments 14A and 15A demonstrates that temperature control during polymerization is important. High hold temperatures applied to the material after polymerization have much less of an effect on product deterioration. On a production scale, reduced pressure will be the most preferred choice of temperature control due to the low surface/volume ratio available for conductive heat transfer.

What is claimed is:

1. A process for the preparation of water-absorbent, water-insoluble polymers, the process comprising:
   continuously polymerizing a monomer in a reactor system comprising at least 3 zones;
   wherein the first zone is an initiation zone to which there is continuously fed a monomer, an initiator and water under conditions such that the polymerization of the monomer is initiated;
   wherein the second zone is a gel-phase zone;
   wherein the third zone is a granulation zone;
   wherein the reactor system has at least two rotating shafts in each of the second and third zones;
   wherein the peak temperature in the second and third zones is from 50° C. to 100° C.; and
   wherein at least a portion of the water fed to the first zone optionally is in the form of steam.

2. The process of claim 1 wherein the monomer comprises from 25–50 weight percent partially neutralized acrylic acid having a degree of neutralization in the range of 50–80 mole percent.

3. The process of claim 1 wherein the temperature of the initiation zone is from 40° C. to 85° C.

4. The process of claim 1 wherein the peak-temperature in the reactor is maintained in a temperature range of 60 to 85° C. by reducing the pressure, evaporating water, and condensing the water under reflux conditions such that the condensate is sent back to the third zone.

5. The process of claim 1 wherein the combined average residence time in the three zones is from 4 to 80 minutes.

6. The process of claim 3 wherein 50 to 90 percent of the total energy input into the first zone is supplied by the heat of the polymerization reaction, 10 to 40 percent is supplied by injected steam, and 0 to 15 percent is supplied by heating the walls of the reaction vessel.

7. The process of claim 1 wherein the polymer discharged from the reactor has a weight average particle size of from 0.2 to 50 mm.

8. The process of claim 1 wherein the feed rate to the first zone is from 0.5 to 5 kg per liter of reactor volume per hour.

9. The process of claim 1 wherein the feed rate to the first zone is from 1.3 to 3.3 kg per liter of reactor volume per hour.

10. The process of claim 1 wherein a persulfate is introduced into the third zone, the discharge stream, or both.

11. The process of claim 1 wherein the monomer is in an aqueous mixture, and wherein the mixture is deoxygenated by countercurrent flow an inert gas prior to being fed to the first zone.

12. The process of claim 1 wherein the combined residence time in the three zones is from 7 to 20 minutes.

13. The process of claim 1 wherein the three zones are contained in one reactor vessel.

14. The process of claim 1 wherein at least the second and third zone are contained in one reactor vessel.

15. The process of claim 1 wherein the first zone is in a vessel separate from the second and third zones.

16. The process of claim 1 wherein the monomer concentration in the feed to the first zone is at least 45 weight percent based on the weight of the feed.

17. The process of claim 1 wherein the wherein at least 2 of the shafts in the reactor system have overlapping radii and rotate in opposite directions.

18. The process of claim 17 wherein at least 2 shafts rotate at different speeds.

19. The process of claim 1 wherein the feed to the first zone comprises a solution of monomer, initiator, and water.

20. The process of claim 1 wherein the monomer comprises acrylic acid.

21. The process of claim 1 wherein polymer fines are recycled.

22. A process for the preparation of water-absorbent, water-insoluble polymers, the process comprising:
   continuously polymerizing a monomer in a reactor system comprising at least 3 zones;
   wherein the first zone is an initiation zone to which there is continuously fed a monomer, an initiator and water under conditions such that the polymerization of the monomer is initiated;
   wherein the second zone is a highly viscous gel-phase zone;
   wherein the third zone is a granulation zone;
   wherein the reactor system has at least two rotating shafts in each of the second and third zones;
   wherein the pressure in at least the second and third zones of the reactor system is subatmospheric; and
   wherein at least a portion of the water fed to the first zone optionally is in the form of steam.

* * * * *